(No Model.)
L. BÉCHAUX, FILS.
COFFEE CAN.
No. 537,961. Patented Apr. 23, 1895.
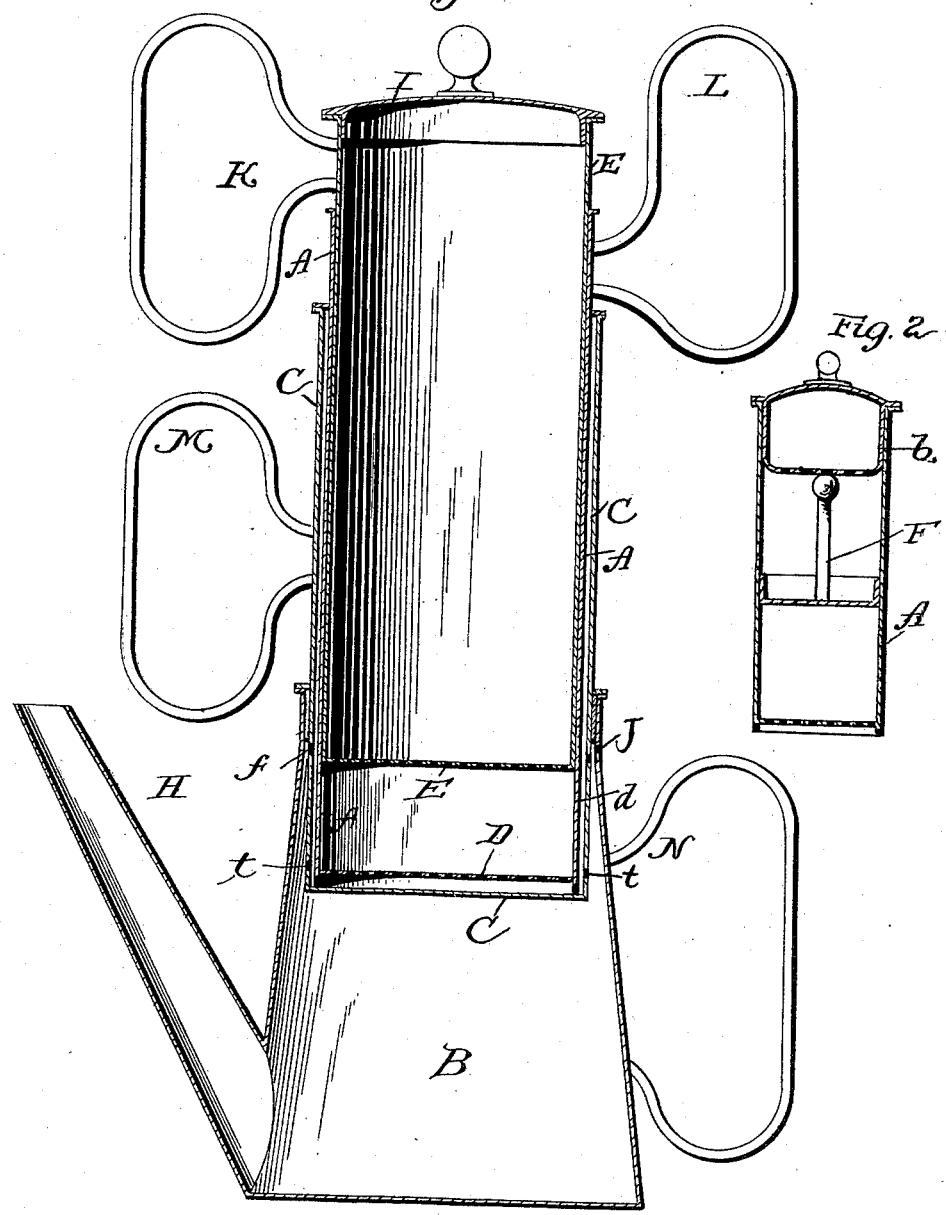

ered useful elements and aromas so that the resi-
UNITED STATES PATENT OFFICE.

LOUIS BÉCHAUX, FILS, OF PORENTRUY, SWITZERLAND.

COFFEE-CAN.

SPECIFICATION forming part of Letters Patent No. 537,961, dated April 23, 1895.

Application filed October 5, 1894. Serial No. 525,016. (No model.) Patented in France February 22, 1894, No. 236,516.

*To all whom it may concern:*

Be it known that I, LOUIS BÉCHAUX, Fils, a citizen of the Republic of Switzerland, residing at Porentruy, Switzerland, have invented certain new and useful Improvements in Coffee-Cans, (patented in France February 22, 1894, No. 236,516,) of which the following is a specification.

The object of the present improvement in coffee cans is to enable the water that passes through a layer of powdered coffee to extract, mechanically, at once and simultaneously by displacement and maceration the essential useful elements and aromas so that the residue which results, retains the injurious elements of the coffee, as gallic acid and resins which give a disagreeable acrid taste to its infusion.

The drawings annexed to this specification show in Figure 1 a vertical section of the can. Fig. 2 is a detail view of a modification.

A, is the filtering cylinder having a perforated bottom upon which the powdered coffee is put and heaped up.

B, is the ordinary lower pot which receives the infusion or solution of coffee.

C, is the new recipient the interposition of which, with sufficient play between the filtering cylinder A and the lower vessel B constitutes my invention. It consists of a cylindrical recipient, a certain part of which penetrates the lower vessel B and supports the filtering cylinder A, the lower edge of which is provided with a few indents for allowing the liquid to pass, the bottom D of the cylinder A being perforated in the shape of a filter and arranged at a little distance from the bottom of the recipient C. The part of the recipient that penetrates the vessel B is limited by a lower perforated flange.

The vessel B is provided with a certain number of small openings $f, f$, suitably distributed through which the solution of coffee runs out; and lower down, near the bottom it is provided with one or two small openings $t$ which allow the discharge of almost all the remaining liquid. The part of the cylinder which projects outside of the vessel B, is as high as possible in order to prevent the water poured into the movable cylinder E from running over its upper edge.

E, is a movable cylinder with a perforated bottom similar to the filtering cylinder A in which it enters freely. It serves at the same time as a beater for compressing the coffee and as a basin for evenly distributing the water upon the same.

Each of the parts A, B, C, E, is respectively provided with a handle L, N, M, K. The cylinder E is provided with a simple cover I and does not require the usual distributing basin. The coffee solution, gathered in the reservoir B is poured out through the spout H or by means of a cock.

J is an air hole.

The coffee is prepared as follows: The cylinder E is taken out of the filtering cylinder A and the ground coffee is placed in the latter. Then the cylinder E is introduced again in the cylinder A so as to compress the coffee. Then the water to prepare the coffee is poured in the cylinder E. The infusion of coffee runs out through the filter D of the cylinder A; but instead of going down directly into the lower vessel B said infusion runs into the intermediate vessel C and rises in the small circular space $d$ until it reaches the point where the orifices $f, f, f$, are located, through which they flow into the lower vessel B; and as the filtering cylinder A retains coffee infusion inside up to the little orifices $f, f, f,$ of the recipient C the result will be that the ground coffee, instead of being simply traversed by the water, will be entirely macerated and will be gradually freed of its useful elements as the level of the water lowers. As, by such maceration the water takes up all useful elements of the ground coffee it will be useless to submit the residue to another maceration or to boiling.

Instead of the cylinder E I may use the presser F on the layer of coffee, as indicated in Fig. 2; and a movable basin $b$ is added to the filtering cylinder A to divide the water in the ordinary manner. It is essential that the edge of the presser be made as watertight as possible by a thin rim, split or otherwise forming a spring or in some other way so that it can be properly fitted.

The described coffee can can also be used for treating all other substances of which it is desired to make an infusion.

I claim—

In combination with a receptacle B, a cylinder C, a second cylinder A within the same having a perforated bottom with a space between the cylinders A and C at sides and bottom the latter having openings in its side walls to the receptacle B and means for pressing the material in the cylinder A, substantially as described.

In witness whereof I have hereunto set my hand in presence of two witnesses.

LOUIS BÉCHAUX, Fils.

Witnesses:
CLYDE SHROPSHIRE,
CH. CASALONGA.